US008822355B2

(12) United States Patent
Ahluwalia

(10) Patent No.: US 8,822,355 B2
(45) Date of Patent: *Sep. 2, 2014

(54) FIRE RESISTANT COMPOSITE MATERIAL AND FABRICS MADE THEREFROM

(75) Inventor: Younger Ahluwalia, Desoto, TX (US)

(73) Assignee: ElkCorp, Dallas, TX (US)

( * ) Notice: Subject to any disclaimer, the term of this patent is extended or adjusted under 35 U.S.C. 154(b) by 1072 days.

This patent is subject to a terminal disclaimer.

(21) Appl. No.: 11/087,354

(22) Filed: Mar. 22, 2005

(65) Prior Publication Data

US 2005/0214555 A1    Sep. 29, 2005

Related U.S. Application Data

(60) Provisional application No. 60/555,927, filed on Mar. 23, 2004, provisional application No. 60/556,037, filed on Mar. 24, 2004.

(51) Int. Cl.
*B32B 27/04* (2006.01)
*B32B 27/12* (2006.01)

(52) U.S. Cl.
USPC ........... 442/143; 442/136; 442/141; 442/147; 428/920; 428/921

(58) Field of Classification Search
USPC ............. 442/79, 97, 101, 123, 136, 148, 152, 442/153, 141, 143, 147; 428/920, 921
See application file for complete search history.

(56) References Cited

U.S. PATENT DOCUMENTS

| | | | |
|---|---|---|---|
| 3,062,682 A | 11/1962 | Morgan et al. | 264/54 |
| 3,248,259 A * | 4/1966 | Borsellino et al. | 442/148 |
| 3,512,192 A | 5/1970 | Simon | 5/698 |
| 3,897,372 A * | 7/1975 | Kehr et al. | 521/122 |
| 3,921,358 A | 11/1975 | Bettoli | 52/314 |
| 4,162,342 A | 7/1979 | Schwartz | 428/159 |
| 4,174,420 A | 11/1979 | Anolick et al. | 428/310 |
| 4,229,329 A | 10/1980 | Bennett | 260/17 R |
| 4,357,436 A | 11/1982 | Zucker et al. | 524/448 |
| 4,495,238 A | 1/1985 | Adiletta | 428/215 |
| 4,504,991 A | 3/1985 | Klancnik | 5/698 |
| 4,600,634 A | 7/1986 | Langer | 428/220 |
| 4,613,627 A | 9/1986 | Sherman et al. | 521/68 |
| 4,717,614 A | 1/1988 | Bondoc et al. | 428/143 |
| 4,745,032 A | 5/1988 | Morrison | 428/215 |
| 4,746,560 A | 5/1988 | Goeden | 428/151 |
| 4,746,565 A | 5/1988 | Bafford et al. | 442/243 |
| 4,784,897 A | 11/1988 | Brands | 428/219 |
| 4,935,232 A * | 6/1990 | McIntosh | 424/409 |
| D309,027 S | 7/1990 | Noone et al. | D25/139 |
| 4,994,317 A | 2/1991 | Dugan et al. | 428/246 |
| 5,001,005 A | 3/1991 | Blanpied | 428/283 |
| 5,086,084 A | 2/1992 | Michaelson | 521/137 |
| 5,091,243 A | 2/1992 | Tolbert et al. | 428/253 |
| 5,110,839 A | 5/1992 | Chao | 521/83 |
| 5,130,191 A | 7/1992 | Pole | 428/332 |
| 5,232,530 A | 8/1993 | Malmquist et al. | 156/78 |
| 5,284,700 A * | 2/1994 | Strauss et al. | 442/141 |
| 5,338,349 A | 8/1994 | Farrar | 106/18.12 |
| 5,345,738 A | 9/1994 | Dimakis | 52/309.9 |
| 5,369,929 A | 12/1994 | Weaver et al. | 52/557 |
| D369,421 S | 4/1996 | Kiik et al. | D25/139 |
| 5,540,980 A | 7/1996 | Tolbert et al. | 428/215 |
| 5,609,957 A | 3/1997 | Page et al. | 428/372 |
| 5,611,186 A | 3/1997 | Weaver | 52/557 |
| 5,666,776 A | 9/1997 | Weaver et al. | 52/557 |
| 5,717,012 A | 2/1998 | Bondoc et al. | 524/13 |
| 5,965,257 A | 10/1999 | Ahluwalia | 428/357 |
| 6,051,193 A | 4/2000 | Langer et al. | 422/179 |
| 6,093,481 A | 7/2000 | Lynn et al. | 428/217 |
| 6,136,216 A | 10/2000 | Fidler et al. | 252/62 |
| 6,145,265 A | 11/2000 | Malarkey et al. | 52/555 |
| 6,207,738 B1 | 3/2001 | Zuckerman et al. | 524/156 |
| 6,228,497 B1 | 5/2001 | Dombeck | 428/392 |
| 6,289,648 B1 | 9/2001 | Freshwater et al. | 52/557 |
| 6,341,462 B2 | 1/2002 | Kiik et al. | 428/352 |
| 6,365,533 B1 | 4/2002 | Horner et al. | 442/374 |
| 6,397,546 B1 | 6/2002 | Malarkey et al. | 452/518 |
| 6,500,560 B1 | 12/2002 | Kiik et al. | 428/489 |

(Continued)

FOREIGN PATENT DOCUMENTS

CA    1073600    3/1980
DE    19729533    1/1999

(Continued)

OTHER PUBLICATIONS

Ohlemiller et al., *Flammability Assessment Methodology for Mattresses*, NISTIR 6497, Jun. 2000.

(Continued)

*Primary Examiner* — Jeremy R Pierce
(74) *Attorney, Agent, or Firm* — Fitzpatrick, Cella, Harper & Scinto

(57) ABSTRACT

The present invention relates to fire resistant composite materials and to fire resistant fabric materials and mattresses made therefrom. The composite materials include (a) a substrate selected from the group consisting of cotton, rayon, lyocell and blends thereof; and (b) a coating consisting essentially of water, ammonium polyphosphate, urea formaldehyde binder material, prefabricated glass microcells, acrylic latex binder, ammonium lauryl sulfate surfactant, thickener material, a second surfactant, surfactant-generated microcells, a catalyst and starch. The binder materials bond the ammonium polyphosphate, prefabricated microcells, thickener material, surfactants, surfactant-generated microcells, catalyst and starch together and to the substrate such that the substrate is coated with the coating.

12 Claims, No Drawings

(56) References Cited

U.S. PATENT DOCUMENTS

| | | | |
|---|---|---|---|
| 6,503,976 B2 | 1/2003 | Zuckerman et al. | 524/156 |
| 6,514,362 B1 | 2/2003 | Zuckerman et al. | 156/79 |
| 6,586,353 B1 | 7/2003 | Kiik et al. | 442/320 |
| 6,660,667 B2 | 12/2003 | Zuckerman et al. | 442/131 |
| 6,673,432 B2 | 1/2004 | Kiik et al. | 428/301.1 |
| 6,708,456 B2 | 3/2004 | Kiik et al. | 52/98 |
| 6,858,550 B2 | 2/2005 | Ahluwalia | 442/136 |
| 6,872,440 B1 | 3/2005 | Kiik et al. | 428/141 |
| 2003/0040241 A1 | 2/2003 | Kiik et al. | 442/242 |
| 2003/0166757 A1* | 9/2003 | Nishihara et al. | 524/430 |
| 2003/0176125 A1 | 9/2003 | Ahluwalia | 442/59 |
| 2003/0224679 A1* | 12/2003 | Ahluwalia | 442/136 |
| 2003/0228460 A1* | 12/2003 | Ahluwalia | 442/136 |
| 2004/0121114 A1* | 6/2004 | Piana et al. | 428/85 |
| 2004/0229052 A1 | 11/2004 | Ahluwalia et al. | 428/457 |
| 2004/0229053 A1 | 11/2004 | Ahluwalia et al. | 428/457 |
| 2004/0229054 A1 | 11/2004 | Ahluwalia et al. | 428/457 |
| 2004/0235379 A1 | 11/2004 | Ahluwalia et al. | 442/59 |
| 2005/0144728 A1 | 7/2005 | Jones et al. | 5/698 |
| 2005/0215149 A1 | 9/2005 | Ahluwalia | 442/152 |
| 2005/0215150 A1 | 9/2005 | Ahluwalia | 442/152 |
| 2005/0215151 A1 | 9/2005 | Ahluwalia | 442/152 |
| 2005/0215152 A1 | 9/2005 | Ahluwalia | 442/152 |
| 2010/0319134 A1 | 12/2010 | Ahluwalia | |
| 2010/0319135 A1 | 12/2010 | Ahluwalia | |
| 2010/0323572 A1 | 12/2010 | Ahluwalia | |

FOREIGN PATENT DOCUMENTS

| | | |
|---|---|---|
| EP | 0388338 | 9/1990 |
| EP | 0391000 | 10/1990 |
| GB | 926749 | 5/1963 |
| GB | 1228592 | 4/1971 |
| GB | 2167060 | 5/1986 |
| RU | 564374 | 8/1977 |
| WO | WO 95/34609 | 12/1995 |
| WO | WO 99/00338 | 1/1999 |
| WO | WO 01/40568 | 6/2001 |
| WO | WO 01/63986 | 8/2001 |
| WO | WO 02/00425 | 1/2002 |
| WO | WO 02/00427 | 1/2002 |
| WO | WO 02/46550 | 6/2002 |
| WO | WO 03/24881 | 3/2003 |

OTHER PUBLICATIONS

State of California Department of Consumer Affairs Bureau of Home Furnishings and Thermal Insulation Technical Bulletin 129, Oct. 1992, *Flammability Test Procedure for Mattresses for use in Public Buildings*.

Popovics, *Concrete Materials: Properties, Specifications and Testing*, pp. 375, 394, Noyes Publications, New Jersey, 1992.

Endur-All Technologies, Inc., *Using DURATHON™ to Re-engineer the Residential Roofing Industry*, Endur-All Technologies, Inc., Colorado, 2001.

Non-Final Office Action issued in U.S. Appl. No. 12/871,081 mailed on May 22, 2013.

Non-Final Office Action issued in U.S. Appl. No. 12/871,174 mailed on Jun. 19, 2013.

Non-Final Office Action issued in U.S. Appl. No. 12/871,272 mailed on Jun. 18, 2013.

* cited by examiner

FIRE RESISTANT COMPOSITE MATERIAL AND FABRICS MADE THEREFROM

FIELD OF THE INVENTION

This invention relates to fire resistant composite materials and to fire resistant fabric materials made therefrom and more particularly to such materials which may be adhered to decorative fabrics to provide fire resistant decorative fabrics especially suitable for use in mattresses, draperies, furniture, upholstery, and the like. The invention further relates to articles of manufacture, e.g. mattresses, comprising the fire resistant fabric materials. The applicant claims the benefits under Title 35, United States Code, Section 119(e) of prior U.S. Provisional Application Ser. No. 60/555,927 which was filed on Mar. 23, 2004 and prior U.S. Provisional Application Ser. No. 60/556,037 which was filed on Mar. 24, 2004.

BACKGROUND OF THE INVENTION

Various attempts have been made to produce fire resistant fabrics having characteristics that made them suitable for use in mattresses and in other applications, e.g., draperies and upholstery.

U.S. Pat. No. 5,540,980 is directed to a fire resistant fabric useful for mattress ticking. The fabric is formed from a corespun yarn comprising a high temperature resistant continuous filament fiberglass core and a low temperature resistant staple fiber sheath which surrounds the core. The fiberglass core comprises about 20% to 40% of the total weight of the corespun yarn while the sheath comprises about 80% to about 60% of the total weight of the corespun yarn. The corespun yarn can be woven or knit to form fabric with fire resistant characteristics. When exposed to a flame, the sheath chars and the fiberglass core serves as a fire barrier. In a preferred embodiment, the sheath is made from cotton.

U.S. Pat. No. 5,091,243 discloses a fire barrier fabric comprising a substrate formed of corespun yarns and a coating carried by one surface of the substrate. Other fire resistant fabrics include Fenix™ (Milliken, LaGrange, Ga.) and fabrics made by Freudenberg (Lowell, Ma.), Ventex Inc. (Great Falls, Va.), BASF, Basofil Fiber Division (Enka, N.C.), Carpenter Co. (Richmond, Va.), Legget and Platt (Nashville, Tenn.), Chiquala Industries Products Group (Kingspoint, Tenn.), and Sandel (Amsterdam, N.Y.). DuPont also manufactures a fabric made from Kevlar™ thread. In addition, the mattress industry has attempted to manufacture mattresses by using Kevlar™ thread, glass thread, flame retardant polyurethane foams, flame retardant ticking, flame retardant cotton cushioning and flame retardant tape. However, use of these materials may add to the cost of mattresses and may result in a cost-prohibitive product. Additionally, some fire-resistant threads, such as glass threads, are difficult to work with and can break, adding to the time required for manufacturing the mattress, which also translates into added costs and can be irritating to the skin, eyes and respiratory system.

Flame retardant tapes are also difficult to work with and increase production time. In addition, flame retardant tapes are only available in a limited number of colors and sizes. Flame retardant polyurethanes may release noxious gases when they smolder and ignite. Furthermore, the process for flame retarding ticking often compromises the desired characteristics of the ticking (e.g. it may no longer be soft, drapable, pliable, flexible, etc).

For many years substrates such as fiberglass have been coated with various compositions to produce materials having utility in, among other applications, the building industry. U.S. Pat. No. 5,001,005 relates to structural laminates made with facing sheets. The laminates described in that patent include thermosetting plastic foam and have planar facing sheets comprising 60% to 90% by weight glass fibers (exclusive of glass micro-fibers), 10% to 40% by weight non-glass filler material and 1% to 30% by weight non-asphaltic binder material. The filler materials are indicated as being clay, mica, talc, limestone (calcium carbonate), gypsum (calcium sulfate), aluminum trihydrate (ATH), antimony trioxide, cellulose fibers, plastic polymer fibers or a combination of any two or more of those substances. The patent further notes that the filler materials are bonded to the glass fibers using binders such as urea-, phenol- or melamine-formaldehyde resins (UF, PF, and MF resins), or a modified acrylic or polyester resin. Ordinary polymer latexes used according to the disclosure are Styrene-Butadiene-Rubber (SBR), Ethylene-Vinyl-Chloride (EVCl), PolyVinylidene Chloride (PvdC), modified PolyVinyl Chloride (PVC), PolyVinyl Alcohol (PVOH), and Poly-Vinyl Acetate (PVA). The glass fibers, non-glass filler material and non-asphaltic binder are all mixed together to form the facer sheets.

U.S. Pat. No. 4,745,032 discloses an acrylic coating comprised of one acrylic underlying resin which includes fly ash and an overlying acrylic resin which differs from the underlying resin.

U.S. Pat. No. 4,229,329 discloses a fire retardant coating composition comprising fly ash and vinyl acrylic polymer emulsion. The fly ash is 24 to 50% of the composition. The composition may also preferably contain one or more of a dispersant, a defoamer, a plasticizer, a thickener, a drying agent, a preservative, a fungicide and an ingredient to control the pH of the composition and thereby inhibit corrosion of any metal surface to which the composition is applied.

U.S. Pat. No. 4,784,897 discloses a cover layer material on a basis of a matting or fabric which is especially for the production of gypsum boards and polyurethane hard foam boards. The cover layer material has a coating on one side which comprises 70% to 94% powdered inorganic material, such as calcium carbonate, and 6% to 30% binder. In addition, thickening agents and cross-linking agents are added and a high density matting is used.

U.S. Pat. No. 4,495,238 discloses a fire resistant thermal insulating composite structure comprised of a mixture of from about 50% to 94% by weight of inorganic microfibers, particularly glass, and about 50% to 6% by weight of heat resistant binding agent.

U.S. Pat. No. 5,965,257, issued to the present assignee, the entire disclosure of which is incorporated herein by reference, discloses a structural article having a coating which includes only two major constituents, while eliminating the need for viscosity modifiers, for stabilizers or for blowing. The structural article of U.S. Pat. No. 5,965,257 is made by coating a substrate having an ionic charge with a coating having essentially the same ionic charge. The coating consists essentially of a filler material and a binder material. The assignee, Elk Corporation of Dallas, produces a product in accordance with the invention of U.S. Pat. No. 5,965,257 which is marketed as VersaShield®.

As indicated in U.S. Pat. No. 5,965,257, VersaShield® has many uses. However, it has been found that the products made in accordance with U.S. Pat. No. 5,965,257 are not satisfactory for certain uses because they lack sufficient drapability.

U.S. Pat. No. 6,858,550 also assigned to the present assignee, the entire disclosure of which is incorporated herein by reference, addresses these inadequacies with a fire resistant fabric material comprising a substrate having an ionic charge coated with a coating having essentially the same ionic charge wherein the coating comprises a filler component which includes clay and a binder component. The fire resistant fabric material thus produced has satisfactory flexibility, pliability and drapability characteristics. However, while this material is suitable as a fire resistant fabric material, it is desirable to provide a fire resistant material that would also have cushioning or "bounceback" characteristics.

U.S. Pat. No. 4,994,317 teaches a multilayered fire resistant material which comprises a flame durable textile fabric substrate, a flexible silicone polymer layer, and a heat reflective paint. Clay may be added to the silicone layer to enhance flame resistance.

U.S. Pat. No. 4,504,991 teaches a mattress comprising a composite material made of a layer of fire retardant material capable of providing a heat barrier bonded to a layer of high tensile strength material. The preferred heat barrier is neoprene and the preferred high tensile strength material is fiberglass. The '991 patent states that the fire retardant material chars, creating a heat shield that protects the inside of the mattress and that the high tensile strength material is required to maintain the structural integrity of the composite when it is exposed to fire to hold the mattress together and prevent the mattress from bursting open and exposing the flammable components of the mattress to the flames.

U.S. patent application Ser. No. 10/354,216, filed on Jan. 29, 2003, the entire disclosure of which is incorporated herein by reference, relates to fire resistant structural materials and to fire resistant fabric materials made therefrom. The structural materials comprise a surfactant component, surfactant generated microcells, a filler component and a binder component. The structural material is fire resistant. The structural material may be used to coat a substrate to make fire resistant fabric materials.

U.S. patent application Ser. No. 10/354,220, filed on Jan. 29, 2003, the entire disclosure of which is incorporated herein by reference, relates to a structural material comprising a prefabricated microcell component, a surfactant component, a surfactant-generated microcell component, a filler component and a binder component. The prefabricated microcell component is essentially a hollow sphere or a component capable of forming a hollow sphere that has been constructed or manufactured before being employed in the structural material. The structural material may be used to coat a substrate to make a fire resistant fabric material.

U.S. patent application Ser. No. 10/354,219, filed on Jan. 29, 2003, the entire disclosure of which is incorporated herein by reference, relates to a structural material comprising a surfactant component, surfactant-generated microcells, a gel catalyst component and a binder component. The structural material may further comprise a filler component. The structural material may be used to coat a substrate to make a fire resistant fabric material.

SUMMARY OF THE INVENTION

The present invention relates to a composite material comprising (a) a substrate selected from the group consisting of cellulosic fibers (e.g., cotton, rayon and lyocell) and blends thereof; and (b) a coating consisting essentially of water, ammonium polyphosphate, urea formaldehyde, binder, prefabricated glass microcells, acrylic latex binder material, an ammonium lauryl sulfate first surfactant, first surfactant-generated microcells, thickener material, a second surfactant, second surfactant-generated microcells, a catalyst, and a starch. The binder materials bond the ammonium polyphosphate, prefabricated glass microcells, ammonium lauryl sulfate first surfactant, first surfactant-generated microcells, thickener material, second surfactant, second surfactant-generated microcells, catalyst and starch together and to the substrate such that that the substrate is coated with said coating.

The structural materials are fire resistant and are useful, inter alia, for making fire resistant fabric materials. The substrate may be planar and may have one or both sides coated. Moreover, the fabric materials may further include a water repellent material, an antifungal material, an antibacterial material, a surface friction agent, and/or an algaecide. Further, the fabric materials may be colored with dye.

The present invention also relates to a mattress fabric comprising a decorative fabric and a fabric material comprising the composite materials of the present invention. Also, the present invention relates to a mattress comprising a decorative fabric and a fabric material comprising the composite materials of the present invention.

The substrate may be any cellulosic material or blends thereof and is preferably woven cotton. The binder component is preferably acrylic latex.

The present invention also relates to an article of manufacture comprising the inventive composite materials and/or the inventive fire resistant fabric materials. The use of the fire resistant materials and fire resistant fabric materials of the present invention for manufacturing fabrics for use in articles such as mattresses, cribs, draperies and upholstered furniture, may enable the article to exceed current flammability standards for these types of articles.

DETAILED DESCRIPTION

In accordance with the invention, a composite material is made comprising (a) a substrate selected from the group consisting of cellulosic materials (e.g., cotton, rayon and lyocell) and blends thereof; and (b) a coating consisting essentially of water, ammonium polyphosphate, urea formaldehyde, binder, prefabricated glass microcells, acrylic latex binder material, an ammonium lauryl sulfate first surfactant, first surfactant-generated microcells, thickener material, a second surfactant, second surfactant-generated microcells, a catalyst, and a starch. The binder materials bond the ammonium polyphosphate, prefabricated glass microcells, ammonium lauryl sulfate first surfactant, first surfactant-generated microcells, thickener material, second surfactant, second surfactant-generated microcells, catalyst and starch together and to the substrate such that the substrate is coated with the coating.

The coating composition is prepared by mixing the following constituents in the following order and approximate initial amounts:

| | |
|---|---|
| 1. water | 10% to 25% by weight |
| 2. ammonium polyphosphate | 35% to 45% by weight |
| 3. urea formaldehyde binder | 3.0% to 7.0% by weight |
| 4. glass bubble microspheres | 2.5% to 10% by weight |
| 5. acrylic latex binder | 18% to 25% by weight |
| 6. ammonium lauryl sulphate surfactant | 0.1% to 1.0% by weight |
| 7. thickener material | 0.1% to 0.5% by weight |
| 8. second surfactant material | 2.5% to 8.0% by weight |
| 9. catalyst | 0.1% to 1.0% by weight |
| 10. starch | 0.5% to 2.5% by weight |

The coating, in a preferred embodiment, is prepared by mixing the constituents listed below in the order given and approximate relative initial amounts provided:

| | |
|---|---|
| 1. water | 17.0% by weight |
| 2. ammonium polyphosphate | 43.2% by weight |
| 3. urea formaldehyde binder | 5.0% by weight |
| 4. glass bubble microspheres | 5.0% by weight |
| 5. acrylic latex binder | 22.0% by weight |
| 6. ammonium lauryl sulfate surfactant | 0.1% by weight |
| 7. thickener material | 0.2% by weight |
| 8. second surfactant material | 6.0% by weight |
| 9. catalyst | 0.5% by weight |
| 10. starch | 1.0% by weight |
| | 100.0% |

Woven cotton (4.0 oz./yd.$^2$) is the preferred substrate. The cotton may optionally be bleached, washed with soap and then dried. The cotton may also optionally be napped to be made soft and fluffy. Besides woven cotton, the substrate may be high loft, needle punched, air laid or otherwise non-woven cotton or other material.

The ammonium polyphosphate is preferably TB 129K which may be obtained from Ribelin Sales of Dallas, Tex. The preferred ammonium polyphosphate includes 31.5% by weight phosphorous, 14.5% by weight nitrogen and the balance, i.e., 54% by weight oxygen (50%)/hydrogen (4%). Acceptable alternative ammonium phosphate is available from Hoechst, Akzo and Great Lakes Chemicals.

The acrylic latex binder is preferably Hycar-2679 which is available from BF Goodrich of Cleveland, Ohio. The Hycar-2679 binder preferably has a melting point of −3° C., is acrylic and anionic, has a solids content of 49%, a pH of 3.7 and a viscosity of 100 cp. Utilization of this binder provides a material having a soft hand and flexibility. Hycar-2679 is self cross linking when exposed to heat of about 350° F. for 10 to 20 seconds. Acceptable alternative binders are available from Rohm & Haas, BASF and Parachem, as well as from BF Goodrich, the supplier of Hycar-2679.

The thickener serves to make the coating an emulsion. A preferred thickener is Rhoplex ASE-95 NP which is available from Rohm & Haas of Charlotte, N.C. Rhoplex ASE-95 NP is an anionic acrylic emulsion of copolymers. Suitable alternative thickener materials are also available from Rohm & Haas and include Rhoplex ASE-75. Parachem, Novean and BASF also supply appropriate thickener materials.

The catalyst is preferably ammonium hydroxide (30% concentrated ammonia in water) which may be obtained from Holly Oak of Fountain Inn, S.C. and numerous other suppliers. The catalyst catalyzes the cross-linking reaction to facilitate the formation of a stronger char (discussed below) and also enhances the pot life of the coating.

The urea formaldehyde binder (30% solids in water) is obtainable from Borden Chemicals of Charlotte, N.C. Suitable alternative area formaldehyde binders are available from BASF, American Cyanamid and Georgia-Pacific.

The preferred glass bubble microspheres are K1-Glass Bubbles obtainable from 3M of St. Paul, Minn. The hollow spheres have a density of approximately 0.3 lbs./gal. Suitable alternatives, including products having different densities, are available from 3M and other suppliers.

The ammonium lauryl sulfate surfactant (approximately 29% solids in water and other liquids) is obtainable from Stepan Chemicals of Chicago, Ill. Such a surfactant is also available from Witco Chemicals.

The second surfactant material, capable of generating microcells, is preferably Stanfax-320 which may be obtained from Parachem Chemicals of Fountain Inn, S.C. Stuart H. Stanfax-320 is a white, milky, soap-like composition of ammonium stearate (33% solids). Parachem offers numerous other acceptable surfactants, as do Tiarco Chemicals of Dalton, Ga. and Standard Adhesives. The microcells generated by both surfactants entrap air (mimicking soap bubbles) and thus diminish the intensity of heat on the underlying substrate because air is a poor conductor of heat. The microcells are generated by injecting air into the composition, preferably 8 parts air to 1 part composition.

The starch may be any commercially available starch, (i.e, laundry starch, food starch, industrial starch). The preferred starch is industrial starch available from National Starch. An acceptable starch is available from many other suppliers.

Although not wishing to be bound by any particular theory, it is believed that the coating, when exposed to heat and/or flame, forms a solid char which serves to protect the substrate and interior mattress components from ignition.

The procedure by which the coating is made is as follows. Water is first added to an open mixing kettle at room temperature. Thereafter, ammonium polyphosphate is added to the water and mixed at vigorous speed to disperse the ammonium polyphosphate in the water. Mixing takes place for approximately 45 minutes to disperse the plate like structure of the ammonium polyphosphate in the water. Binder is then added, and then the remaining constituents, all of which are mixed for another 45 minutes. All of these steps are accomplished in an open kettle at room temperature.

To coat the substrate, preferably a very thin film of coating is applied by knife to a cotton fabric. The material is then dried at 350° F. in an oven to create the fire resistant material of the present invention. It is believed that, when the aqueous coating is applied to the substrate, the cotton fabric absorbs some of the water and retains some of the water after the coating has been dried in the oven.

The composite materials of the present invention may be utilized in mattress construction by placing the materials on the top of the mattress under the ticking and/or in the side of the mattress inside the ticking.

The composite materials of the present invention were tested in accordance with the State of California Department of Consumer Affairs Bureau of Home Furnishings and Thermal Insulation Technical Bulletin 603, "Requirements And Test Procedure For Resistance Of A Mattress/Box Spring Set to a Large Open-Flame", which issued in January 2004, the entirety of which is incorporated herein by reference. In accordance with the test criteria, "A mattress, a futon or a mattress/box spring set fails to meet the requirements of this test procedure if any of the following criteria are exceeded:

A peak rate of heat release of 200 kW.

A total heat release of 25 MJ in the first 10 minutes of the test."

The composite material of the present invention passed the California Technical Bulletin 603 test. The inventive material was below the peak-heat of release and total heat release criteria set forth in California's Technical Bulletin 603. The composite material of the present invention protected the flammable products inside the mattress during the required exposures to flame. The formation of a rigid layer of char stopped the flame from igniting the combustible products within the mattress.

As indicated, the fire resistant fabric material of the present invention is useful in the manufacture of mattresses. In this embodiment of the invention, the fire resistant fabric material may be used to line a decorative mattress fabric to produce a fire resistant mattress fabric. Nonlimiting examples of mattress fabrics include ticking (known in the art as a strong, tightly woven fabric comprising cotton or linen and used especially to make mattresses and pillow coverings), or fabrics comprising fibers selected from the group consisting of cotton, polyester, rayon, polypropylene, and combinations thereof. The lining may be achieved by methods known in the art. For example, the fire resistant fabric material of the present invention may simply be placed under a mattress fabric. Or, the fire resistant mattress material may be bonded or adhered to the mattress fabric, for example using a flexible and preferably nonflammable glue or stitched with fire resistant thread i.e., similar to a lining. The fire resistant mattress fabric of the present invention may then be used by the skilled artisan to manufacture a mattress which has improved flammability characteristics.

Composite materials and fire resistant fabric materials made in accordance with this invention may be of any shape. Preferably, such articles are planar in shape. The composite materials may be used in any of a variety of products including, but not limited to mattress/crib fabrics, mattress/crib covers, upholstered articles, bedroom articles, (including children's bedroom articles), draperies, carpets, wall coverings (including wallpaper) tents, awnings, fire shelters, sleeping bags, ironing board covers, fire resistant gloves, furniture, airplane seats and carpets, fire-resistant clothing for race car drivers, fire fighters, jet fighter pilots, and the like.

The structural material may be used alone or may be used as a liner for a decorative fabric, such as the type used for mattresses, drapes, sleeping bags, tents etc. which may also be fire resistant.

Additionally, the fire resistant material may be coated with a water repellent material or the water repellent material may be added in the coating (i.e., internal water proofing). Two such water repellent materials are Aurapel™ 330R and Aurapel™ 391 available from Sybron/Tanatex of Norwich, Conn. In addition, Omnova Sequapel™ and Sequapel 417 (available from Omnovasolutions, Inc. of Chester, S.C.); BS-1306, BS-15 and BS-29A (available from Wacker of Adrian, Mich.); Syl-off™-7922, Syl-off™-1171A, Syl-off™7910 and Dow Corning 346 Emulsion (available from Dow Corning, Corporation of Midland, Mich.); Freepel™-1225 (available from BFG Industries of Charlotte, N.C.); and Michem™ Emulsion-41740 and Michem™ Emulsion-03230 (available from Michelman, Inc. of Cincinnati, Ohio) may also be used. It is believed that wax emulsions, oil emulsions, silicone emulsions, polyolefin emulsions and sulfonyls as well as other similar performing products may also be suitable water repellent materials. These materials are also useful for imparting bounceback characteristics to the fire resistant materials of the present invention. Water repellents may be particularly preferred for example, in the manufacture of crib mattresses, for airplane seats and in the manufacture of furniture, particularly for industrial use.

In addition, color pigments, including, but not limited to, T-113 (Abco, Inc.), W-4123 Blue Pigment, W2090 Orange Pigment, W7717 Black Pigment and W6013 Green Pigment, iron oxide red pigments (available from Engelhard of Louisville, Ky.) may also be added to the coating of the present invention to impart desired characteristics, such as a desired color.

The additional coatings of, e.g. water repellent material, antifungal material, antibacterial material, etc., may be applied to one or both sides of fire resistant materials and fire resistant fabric materials. For example, fire resistant fabric materials comprising substrates coated on one or both sides with filler/binder coatings could be coated on one side with a water repellent composition and on the other side with an antibacterial agent. Alternatively, the water repellent material, antifungal material, antibacterial material, etc., may be added to the coating before it is used to coat the substrate.

What is claimed is:

1. A composite material comprising:
   (a) a substrate selected from the group consisting of cotton, rayon, lyocell, and blends thereof; and
   (b) a coating consisting essentially of water, about 35% to about 45% by weight ammonium polyphosphate, about 3.0% to about 7.0% by weight urea formaldehyde binder, about 2.5% to about 10% by weight prefabricated glass microcells, about 18% to about 25% by weight acrylic latex binder, about 0.1% to about 1.0% by weight ammonium lauryl sulfate first surfactant and first surfactant-generated microcells, about 0.1% to about 0.5% by weight thickener material, about 2.5% to about 8.0% by weight second surfactant and second surfactant-generated microcells, about 0.1% to about 1.0% by weight catalyst, and about 0.5% to about 2.5% by weight starch;
   wherein said binder materials bond the ammonium polyphosphate, prefabricated glass microcells, ammonium lauryl sulfate first surfactant, first surfactant-generated microcells, thickener material, second surfactant, second surfactant-generated microcells, catalyst, and starch together and to the substrate such that the substrate is coated with said coating.

2. The composite material according to claim 1 wherein said substrate is planar and is coated on one side with said coating.

3. The composite material according to claim 1 wherein said substrate is planar and is coated on both sides with said coating.

4. The composite material according to claim 1, 2 or 3, wherein said material further includes a water repellent material.

5. The composite material according to claim 1, 2 or 3 wherein said material further includes an antifungal material.

6. The composite material according to claim 1, 2 or 3 wherein said material further includes an antibacterial material.

7. The composite material according to claim 1, 2 or 3 wherein said material further includes a surface friction agent.

8. The composite material according to claim 1, 2 or 3 wherein said material further includes a flame retardant material.

9. The composite material according to claim 1, 2 or 3 wherein said material further includes an algaecide.

10. The composite material according to claim 1, 2 or 3 wherein said material is colored with dye.

11. A mattress fabric comprising a decorative fabric and the composite material according to claim 1.

12. A mattress comprising the mattress fabric of claim 11.

* * * * *